US010015376B2

(12) United States Patent
Uchida

(10) Patent No.: US 10,015,376 B2
(45) Date of Patent: Jul. 3, 2018

(54) IMAGING APPARATUS WITH PHASE DIFFERENCE FOCUS DETECTION AND METHOD FOR CONTROLLING SAME

(71) Applicant: CANON KABUSHIKI KAISHA, Tokyo (JP)

(72) Inventor: Mineo Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/211,614

(22) Filed: Mar. 14, 2014

(65) Prior Publication Data

US 2014/0284449 A1 Sep. 25, 2014

(30) Foreign Application Priority Data

Mar. 19, 2013 (JP) .................................. 2013-055927

(51) Int. Cl.
| | |
|---|---|
| *H04N 5/225* | (2006.01) |
| *G02B 15/14* | (2006.01) |
| *H04N 5/235* | (2006.01) |
| *H04N 5/369* | (2011.01) |
| *G02B 7/34* | (2006.01) |

(52) U.S. Cl.
CPC ............ *H04N 5/2254* (2013.01); *G02B 7/34* (2013.01); *G02B 15/14* (2013.01); *H04N 5/2352* (2013.01); *H04N 5/3696* (2013.01)

(58) Field of Classification Search
CPC ....... H04N 5/2352; H04N 5/3696; G02B 7/34
See application file for complete search history.

(56) References Cited

U.S. PATENT DOCUMENTS

| | | |
|---|---|---|
| 5,652,925 A | 7/1997 | Aoyagi et al. |
| 6,933,978 B1 | 8/2005 | Suda |
| 2013/0250154 A1 | 9/2013 | Hirose et al. |

FOREIGN PATENT DOCUMENTS

| | | |
|---|---|---|
| JP | H08-075548 A | 3/1996 |
| JP | 2001-124984 A | 5/2001 |

(Continued)

OTHER PUBLICATIONS

English machine translation of JP2012-042597, Kusaka, publication date: Mar. 1, 2012.*

(Continued)

*Primary Examiner* — Renee Chavez
(74) *Attorney, Agent, or Firm* — Fitzpatrick, Cella, Harper & Scinto

(57) ABSTRACT

An imaging element includes pixel portions each having a first sub-pixel and a second sub-pixel and outputs a phase difference detection-type focus detecting signal. An image signal A includes information for the first sub-pixel and an image signal AB includes information for the second sub-pixel. A level determining unit compares the image signal A with a threshold value SHA and compares the image signal AB with a threshold value SHAB. A correlation calculation processing unit performs correlation calculation for a signal excluding the image signal A having a level exceeding the threshold value SHA and the image signal AB having a level exceeding the threshold value SHAB so as to output the result of calculation to a CPU. The CPU calculates a focal shift amount in accordance with the result of calculation and performs a focus adjusting operation by drive-controlling a focus lens.

20 Claims, 10 Drawing Sheets

(56) References Cited

FOREIGN PATENT DOCUMENTS

| JP | 2011-257565 A | 12/2011 |
| JP | 2012-042597 A | 3/2012 |
| JP | 2012-168246 A | 9/2012 |
| JP | 2012-230172 A | 11/2012 |

OTHER PUBLICATIONS

U.S. Appl. No. 14/211,571, filed Mar. 14, 2014.
Office Action dated Jul. 14, 2015, in Japanese Patent Application No. 2013-055927.
Office Action issued Feb. 9, 2016, in Japanese Patent Application No. 2013-055927.

* cited by examiner

OUT-OF-FOCUS STATE

SUBSTANTIALLY FOCUSED STATE

IMAGING APPARATUS WITH PHASE DIFFERENCE FOCUS DETECTION AND METHOD FOR CONTROLLING SAME

BACKGROUND OF THE INVENTION

Field of the Invention

The present invention relates to an imaging apparatus using an imaging element having a plurality of photoelectric conversion units included in each pixel and a method for controlling the same.

Description of the Related Art

In recent years, multifunctioning for imaging apparatuses using an imaging element such as a CMOS (complementary metal-oxide film semiconductor) sensor or the like has been developed. Not only generation of still image data or moving image data but also control of an imaging apparatus such as focus adjustment are performed based on image information obtained by an imaging element.

Japanese Patent Laid-Open No. 2001-124984 discloses a technique that performs pupil division focus detection using an imaging signal obtained from an imaging element. One microlens and two photodiodes are provided for each pixel of the imaging element, so that each photodiode receives light fluxes transmitted through different pupil areas of an image-taking lens. Focus detection can be performed by comparing output signals from adjacent ones of the photodiodes and captured image data can be generated by summing these output signals.

When signals subjected to pupil division is acquired from a plurality of photodiodes included in each pixel, a phenomenon in which a signal from one photodiode leaks into the other photodiode may occur depending on the structure of the photodiodes upon a high intensity exposure. Consequently, signals subjected to pupil division may not be correctly read. In other words, the reliability of the signals acquired from the imaging element is decreased in a state in which light intensity is greater than a certain level, which may imperil exact focus detecting calculation.

SUMMARY OF THE INVENTION

The present invention provides an imaging apparatus provided with an imaging element which includes pixel portions each having a plurality of photoelectric conversion units and outputs a focus detecting signal from each of the photoelectric conversion units so as to perform exact focus detection by suppressing the adverse effect of signals with low reliability.

According to an aspect of the present invention, an imaging apparatus is provided that includes an imaging element that includes pixel portions each having a plurality of photoelectric conversion units and outputs a focus detecting signal from each of the photoelectric conversion units; a drive unit configured to drive a focus adjusting lens; a calculation unit configured to acquire the focus detecting signal so as to perform phase difference detection-type focus detecting calculation; and a control unit configured to acquire the result of calculation performed by the calculation unit and control the drive unit so as to perform focus adjustment. The calculation unit acquires a first signal including an output signal from a first photoelectric conversion unit from among the plurality of photoelectric conversion units and compares the first signal with a first threshold value and then acquires a second signal including an output signal from a second photoelectric conversion unit and compares the second signal with a second threshold value so as to perform focus detecting calculation using a signal excluding the first signal exceeding the first threshold value and the second signal exceeding the second threshold value.

According to the present invention, exact focus detection may be performed by suppressing the adverse effect of signals with low reliability.

Further features of the present invention will become apparent from the following description of exemplary embodiments with reference to the attached drawings.

DESCRIPTION OF THE EMBODIMENTS

Figure 1:
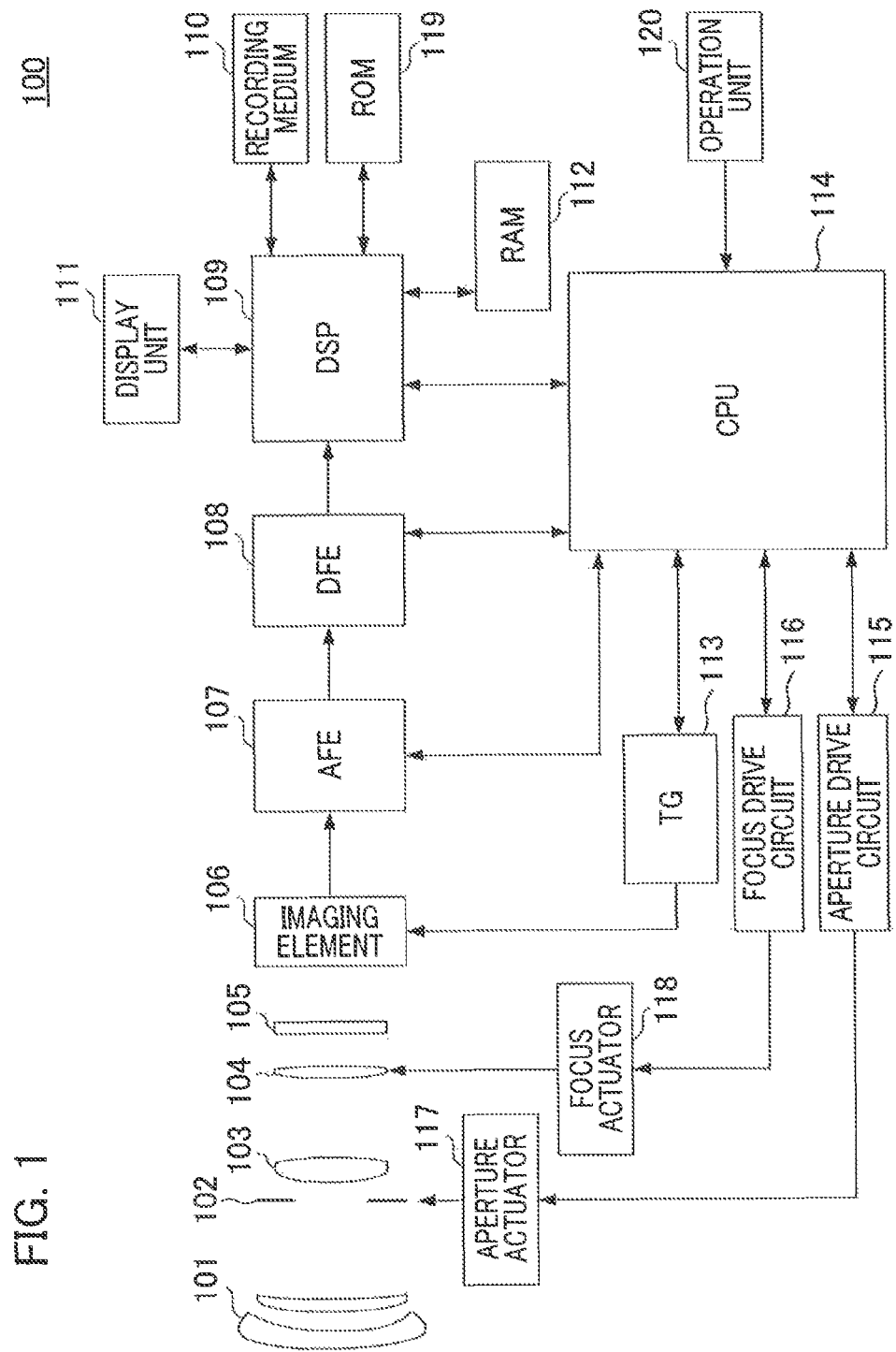
FIG. 1 is a diagram illustrating an overall configuration of an imaging apparatus according to an embodiment of the present invention.

Hereinafter, preferred embodiments of the present invention will be described with reference to the drawings. FIG. 1 is a diagram illustrating an overall configuration of an imaging apparatus 100 according to an embodiment of the present invention.

A first lens group 101 is an imaging optical system arranged at the front end (object side) of a lens barrel, and is held so as to be extendable and retractable in the optical axis direction. An aperture 102 adjusts its aperture diameter to adjust the light quantity when shooting. A second lens group 103 has a variable power action (zooming function) in synchronism with the reciprocal movement of the first lens group 101. A third lens group 104 is a focus-adjusting lens (focus lens) for focusing by advancing and retracting in the optical axis direction. An optical low-pass filter 105 is an optical element for reducing the false color or moiré of a shot image.

An imaging element 106 photoelectrically converts an object image imaged by the imaging optical system. In the present embodiment, a Bayer-pattern CMOS image sensor is used as the imaging element 106. Each pixel of the imaging element 106 has a plurality of photoelectric conversion units. A plurality of photodiodes (hereinafter abbreviated as "PD") is provided in each pixel to be described below. The number of PDs provided in one pixel portion is two or more (two, four, nine, or the like). For example, in the present embodiment, a sub-pixel "a" and a sub-pixel "b" are respectively constituted by two PDs. An analog image signal output from the imaging element 106 is converted into a digital signal by an AFE (Analog Front End) 107. A digital image signal output from the AFE 107 is input to a DFE (Digital Front End) 108 for performing predetermined calculation processing. The DFE 108 detects an image deviation using signals obtained from the sub-pixels "a" and "b" in each pixel portion so as to perform correlation calculation for calculating a phase shift amount.

A DSP (Digital Signal Processor) 109 performs correction processing, development processing, or the like for a digital image signal output from the DFE 108. A recording medium 110 records image data processed by the DSP 109. A display unit 111 includes a liquid crystal display (LCD) or the like for displaying a shot image, various menu screens, and the like. A RAM (Random Access Memory) 112 is a device for temporarily storing image data or the like and is connected to the DSP 109. A timing generator (TG) 113 supplies a drive signal to the imaging element 106.

A CPU (Central Processing Unit) 114 controls the AFE 107, the DFE 108, the DSP 109, the TG 113, and an aperture drive circuit 115. Also, the CPU 114 performs AF (Auto Focus) control that calculates a focal shift amount (defocus amount) from the results of correlation calculation calculated by the DFE 108 so as to control a focus drive circuit 116 depending on the focal shift amount. The focus drive circuit 116 is a drive unit for driving a focus actuator 118 and performs focus adjustment by advancing and retreating the third lens group 104 in the optical axis direction. The aperture drive circuit 115 drives an aperture 102 by controlling an aperture actuator 117 in accordance with a control command given by the CPU 114. A ROM (Read Only Memory) 119 stores correction data or the like. An operation unit 120 includes a shutter switch button (SW). An instruction signal given by the user or photographer is input to the CPU 114 according to the user's or photographer's half-press or full press of the shutter switch button.

Figure 2:
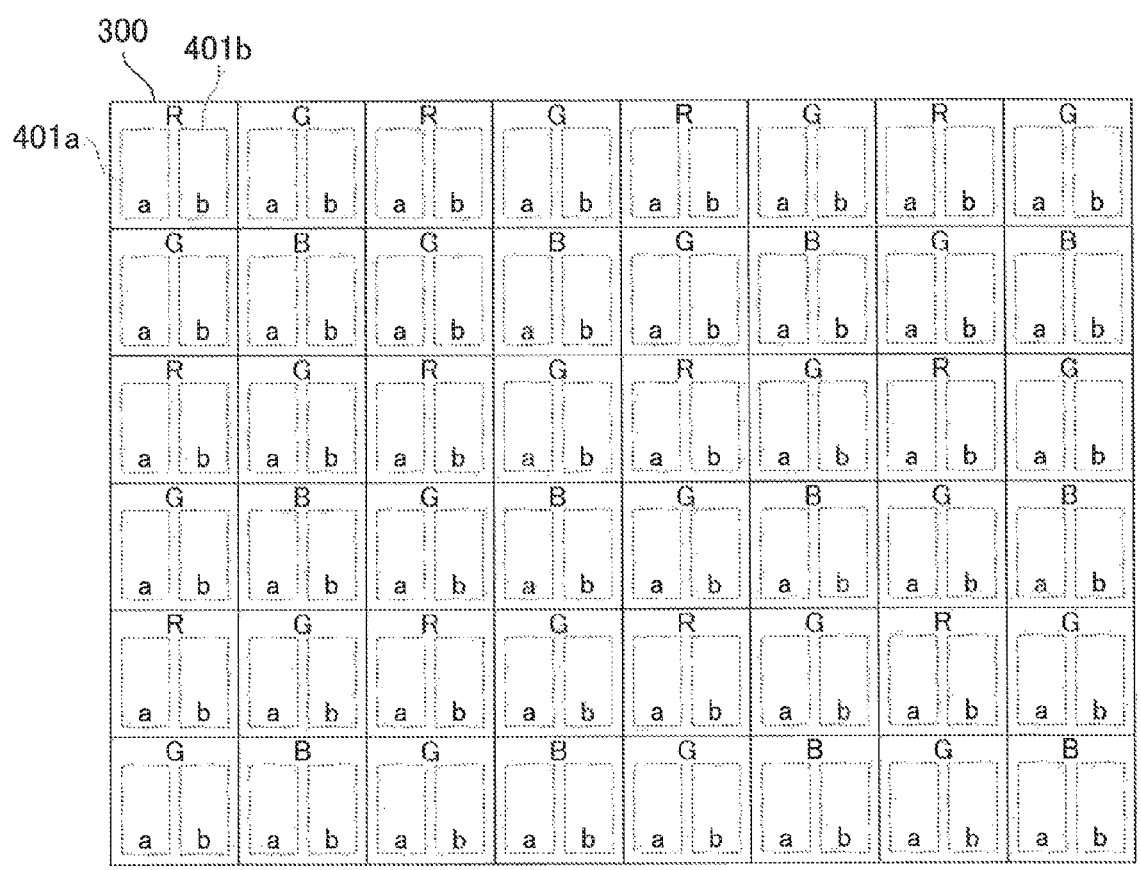
FIG. 2 is a diagram illustrating a pixel layout of an imaging element according to an embodiment of the present invention.

FIG. 2 is a schematic diagram illustrating an exemplary pixel layout of the imaging element 106. Unit pixel portions 300 are arrayed in rows and columns, and the red, green, and blue (RGB) color filters are arrayed in a Bayer-pattern. The sub-pixel "a" and the sub-pixel "b" are arrayed in each unit pixel portion 300. In FIG. 2, a PD 401a is a first photoelectric conversion unit constituting the sub-pixel "a" and a PD 401b is a second photoelectric conversion unit constituting the sub-pixel "b". The signals from the sub-pixel "a" and the sub-pixel "b" are used for focus detection. An a/b summed signal (hereinafter simply referred to as "summed signal") obtained by summing the signal from the sub-pixel "a" and the signal from the sub-pixel "b" is used for generating image data.

Figure 3:
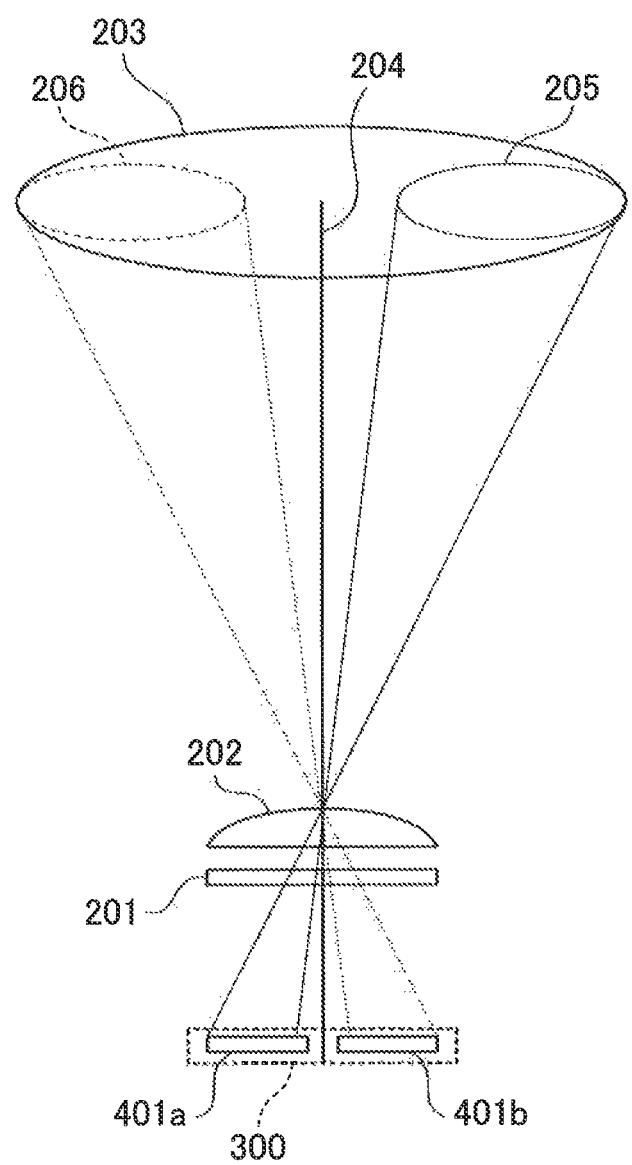
FIG. 3 is a schematic diagram illustrating the relationship between a light flux emerging from the exit pupil of an image-taking lens and a pixel.

FIG. 3 is a schematic diagram illustrating the relationship between light fluxes emitted from an exit pupil 203 of an image-taking lens constituted by the first to third lens groups and the aperture (see reference numerals 101 to 104 shown in FIG. 1) and the unit pixel portion 300. The unit pixel portion 300 has the PD 401a and the PD 401b. A color filter 201 and a microlens 202 are formed on the unit pixel portion 300.

The center of the light fluxes emitted from the exit pupil 203 to the pixel portion having the microlens 202 is defined as an optical axis 204. Light fluxes transmitted through the exit pupil 203 enter the unit pixel portion 300 about the optical axis 204. Each of areas 205 and 206 represent the partial region of the exit pupil 203 of the image-taking lens. The light flux transmitted through the area 205 as shown in FIG. 3 is received by the PD 401a (the sub-pixel "a") through the microlens 202. Also, the light flux transmitted through the pupil area 206 is received by the PD 401b (the sub-pixel "b") through the microlens 202. Thus, the sub-pixel "a" and the sub-pixel "b" receive the respective light fluxes transmitted through different areas of the exit pupil 203 of the image-taking lens. Thus, phase difference-type focus detection can be performed by comparing output signals from the sub-pixel "a" and the sub-pixel "b".

Figure 4A:
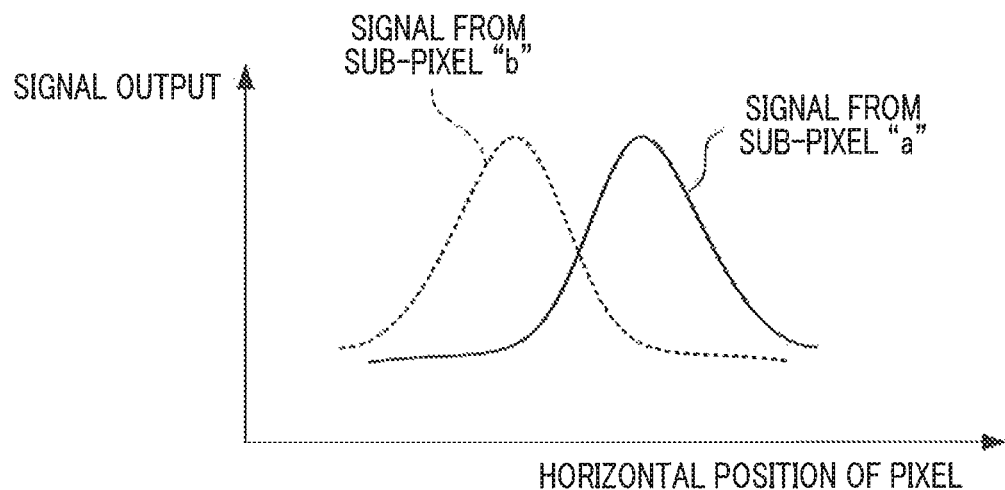
FIGS. 4A and 4B are schematic diagrams illustrating the relationship between a focus adjustment state and an image signal.
Figure 4B:
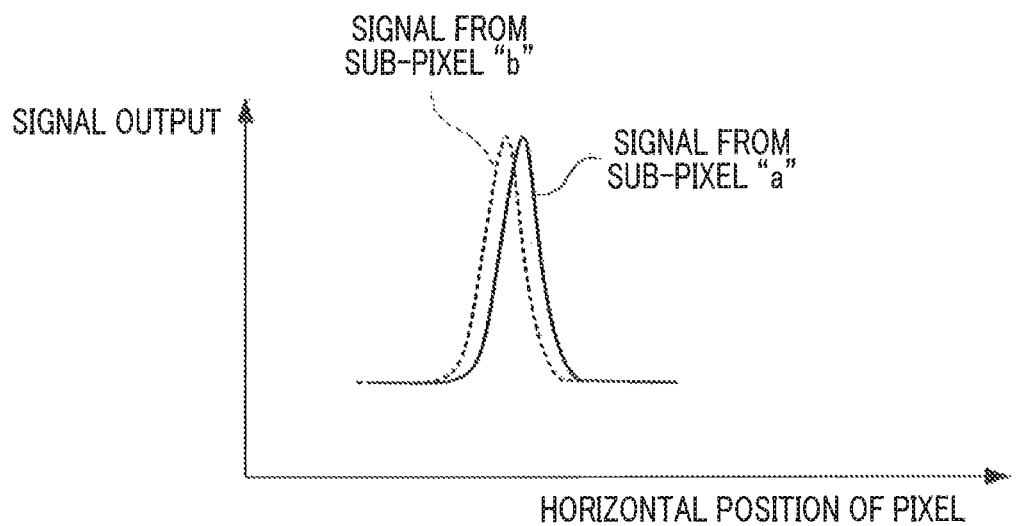

FIGS. 4A and 4B are schematic diagrams illustrating an image signal waveform obtained from the sub-pixel "a" and an image signal waveform obtained from the sub-pixel "b", where a pixel position in the horizontal direction is plotted on the horizontal axis and a signal output level is plotted on the vertical axis.

FIG. 4A illustrates image signal waveforms in an out-of-focus state. The image signal waveforms obtained from the sub-pixels "a" and "b" do not match but are offset from one another. As a state closes to the focused state, the offset between the image signal waveforms decreases as shown in FIG. 4B, and the image signal waveforms are overlapped in the focused state. As described above, a focal shift amount (defocus amount) can be detected by the correlation between image signal waveforms obtained from the sub-pixels "a" and "b" so that focus adjustment can be performed based on the detection result.

Figure 5:
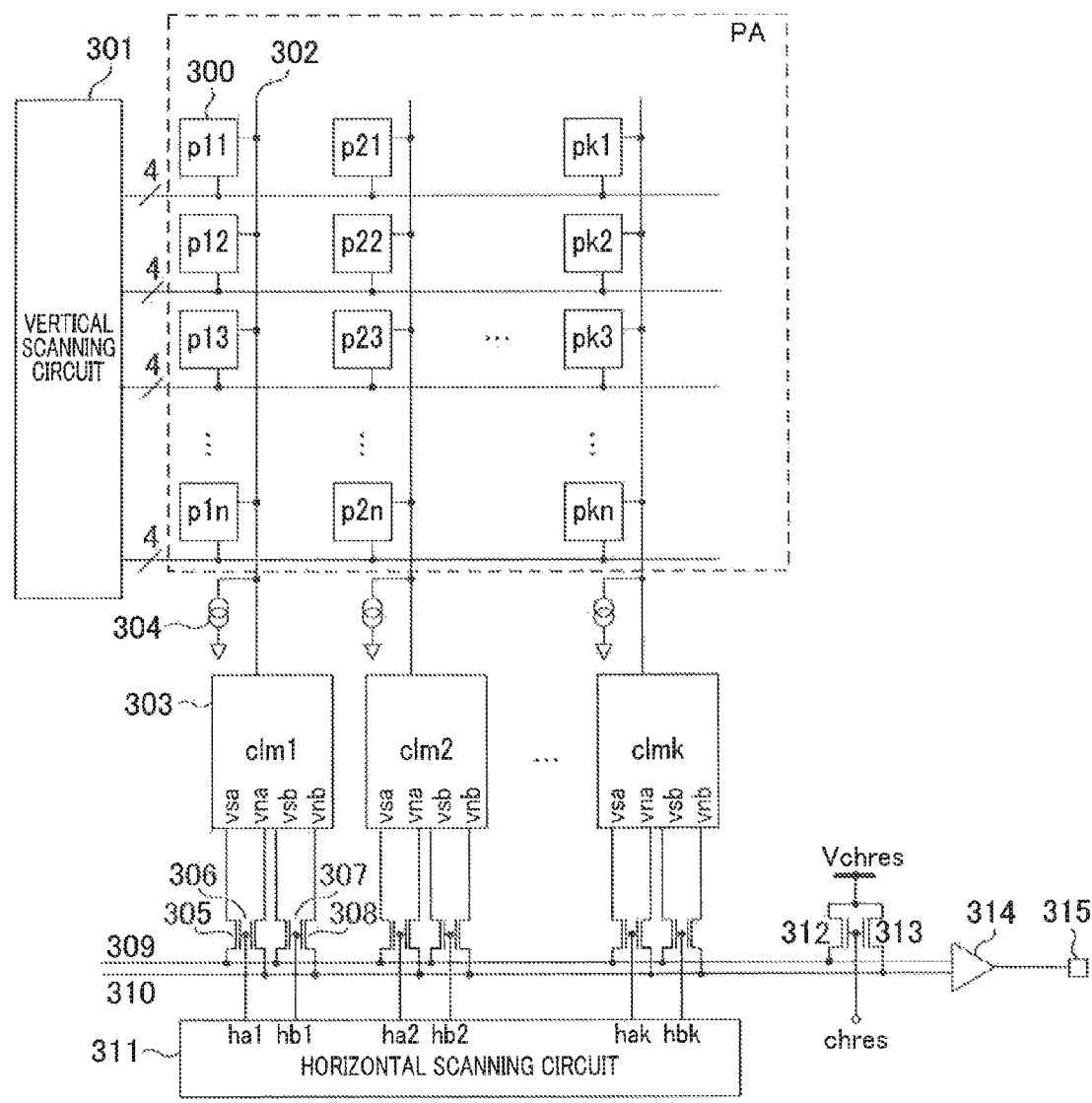
FIG. 5 is a diagram illustrating an overall configuration of an imaging element.
Figure 6:
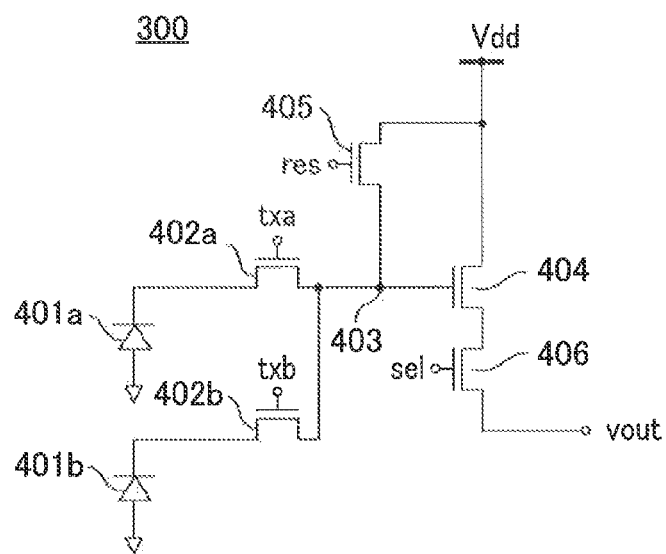
FIG. 6 is a diagram illustrating an exemplary circuit configuration of a pixel in an imaging element.
Figure 7:
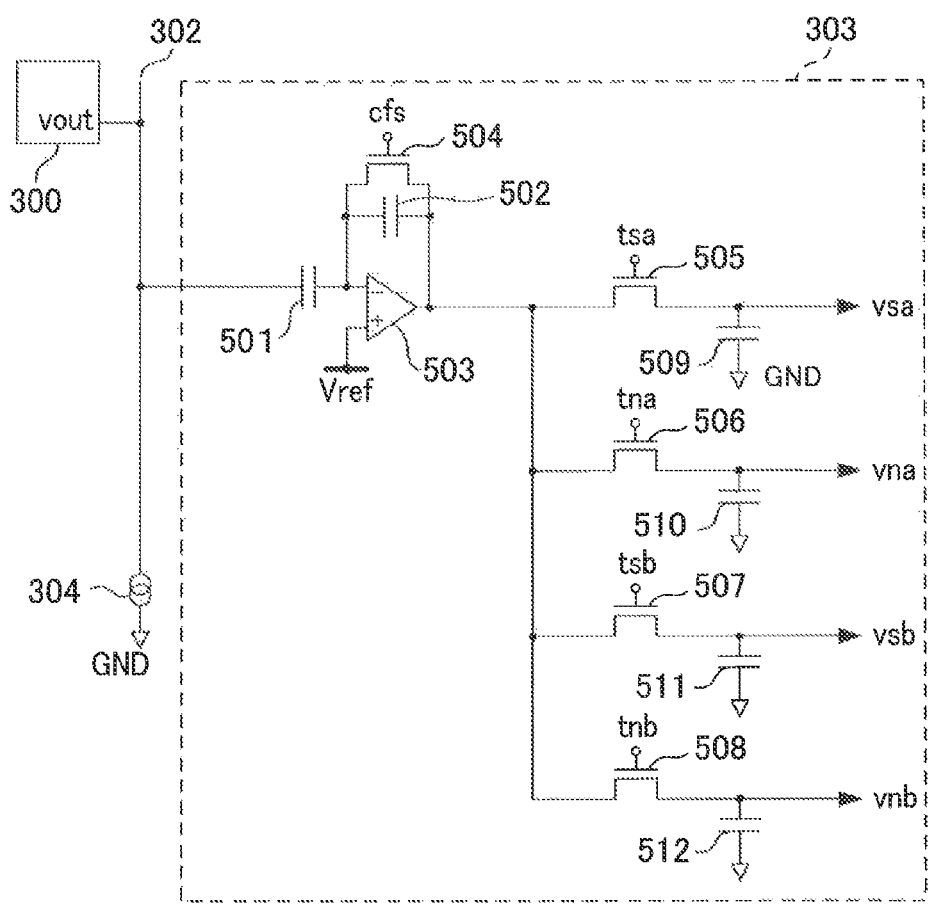
FIG. 7 is a diagram illustrating a configuration of a read circuit for each column of an imaging element.

Next, a description will be given of a configuration of the imaging element 106 with reference to FIG. 5 to FIG. 7. FIG. 5 is a diagram illustrating an overall configuration of the imaging element 106. FIG. 6 is a circuit diagram illustrating a configuration of the unit pixel portion 300. FIG. 7 is a circuit diagram illustrating a configuration of a column common read circuit 303.

A plurality of unit pixel portions 300 (see p11 to pkn) is arrayed in rows and columns on a pixel area PA shown in FIG. 5. A description will be given of a configuration of the unit pixel portion 300 with reference to FIG. 6.

The PDs 401a and 401b photoelectrically convert incident light and accumulate electric charges depending on an exposure amount. Transfer gates 402a and 402b are set in an ON state by setting signals txa and txb to High level. In this manner, electric charges accumulated in the PDs 401a and 401b are transferred to an FD (Floating Diffusion) unit 403. The FD unit 403 is connected to a gate of a floating diffusion amplifier 404 (hereinafter referred to as "FD amplifier"). The FD amplifier 404 converts the amount of electric charges transferred from the PDs 401a and 401b into a voltage amount. An FD reset switch 405 resets the FD unit 403 by setting a signal res to High level. Also, when electric charges accumulated in the PDs 401a and 401b are reset, the signal res, the signal txa, and the signal txb are simultaneously set to High level. When the transfer gates 402a and 402b and the FD reset switch 405 are in an ON state, the PDs 401a and 401b are reset via the FD unit 403. A pixel selection switch 406 sets a signal sel to High level, and thus, a pixel signal converted into a voltage by the FD amplifier 404 is output from the output terminal vout of the unit pixel portion 300.

A vertical scanning circuit 301 shown in FIG. 5 supplies gate control signals (res, txa, txb, and sel) to transistors provided in the unit pixel portion 300. These signals are common for each row. The output terminal vout of each of the unit pixel portions 300 is connected to the column common read circuit 303 via a vertical output line 302 for each column. A description will be given of a configuration of the column common read circuit 303 with reference to FIG. 7.

The vertical output line 302 is provided for each column and is connected to the output terminals vout of the unit pixel portions 300 for one column. The vertical output line 302 is connected to a current source 304. A source follower circuit is constituted by the current source 304, and the FD amplifiers 404 of the unit pixel portions 300 connected to the vertical output line 302.

A clamp capacitor (C1) 501 is connected to the inversed input terminal of a calculation amplifier 503. A feedback capacitor (C2) 502 is connected to the output terminal and the inversed input terminal of the calculation amplifier 503. Note that the feedback capacitor C2 is a variable capacitor. An amplification gain for an input signal of the calculation amplifier 503 can be changed by changing the electrostatic capacity value. A reference power source Vref is connected to the non-inversed input terminal of the calculation amplifier 503. A switch 504 is a transistor for shorting-out the opposite ends of the feedback capacitor C2 and is controlled by a signal cfs. Transfer switches 505 to 508 are transistors that transfer signals read from the unit pixel portions 300 to signal storage capacitors 509 to 512, respectively. By the following read operation to be described below, a pixel signal Sa from the sub-pixel "a" is stored in the first signal S storage capacitor 509, and a summed signal Sab obtained by summing a signal from the sub-pixel "a" and a signal from the sub-pixel "b" is stored in the second signal S storage capacitor 511. Each of the first signal N storage capacitor 510 and the second signal N storage capacitor 512 stores a noise signal N from the unit pixel portion 300. The signal storage capacitors 509 to 512 are respectively connected to the output terminals vsa, vna, vsb, and vnb of the column common read circuit 303.

Horizontal transfer switches 305 and 306 are respectively connected to the output terminals vsa and vna of the column common read circuit 303 shown in FIG. 5. The horizontal transfer switches 305 and 306 are controlled by an output signal ha* (* represents any column number) from a horizontal scanning circuit 311. By setting the signal ha* to High level, the signals from the first signal S storage capacitor 509 and the first signal N storage capacitor 510 are transferred to horizontal output lines 309 and 310, respectively.

Also, horizontal transfer switches 307 and 308 are connected to the output terminals vsb and vnb of the column common read circuit 303, respectively. The horizontal transfer switches 307 and 308 are controlled by an output signal hb* (* represents any column number) from the horizontal scanning circuit 311. By setting the signal hb* to High level, the signals from the second signal S storage capacitor 511 and the second signal N storage capacitor 512 are transferred to the horizontal output lines 309 and 310, respectively.

The horizontal output lines 309 and 310 are connected to the input terminals of a differential amplifier 314. The differential amplifier 314 calculates a difference between the signal S and the signal N and simultaneously multiplies the difference by a predetermined gain so as to output a final output signal to an output terminal 315. Horizontal output line reset switches 312 and 313 are in an ON state by setting a signal chres to High level, and the horizontal output lines 309 and 310 are set to reset voltages Vchres (reset).

Figure 8:
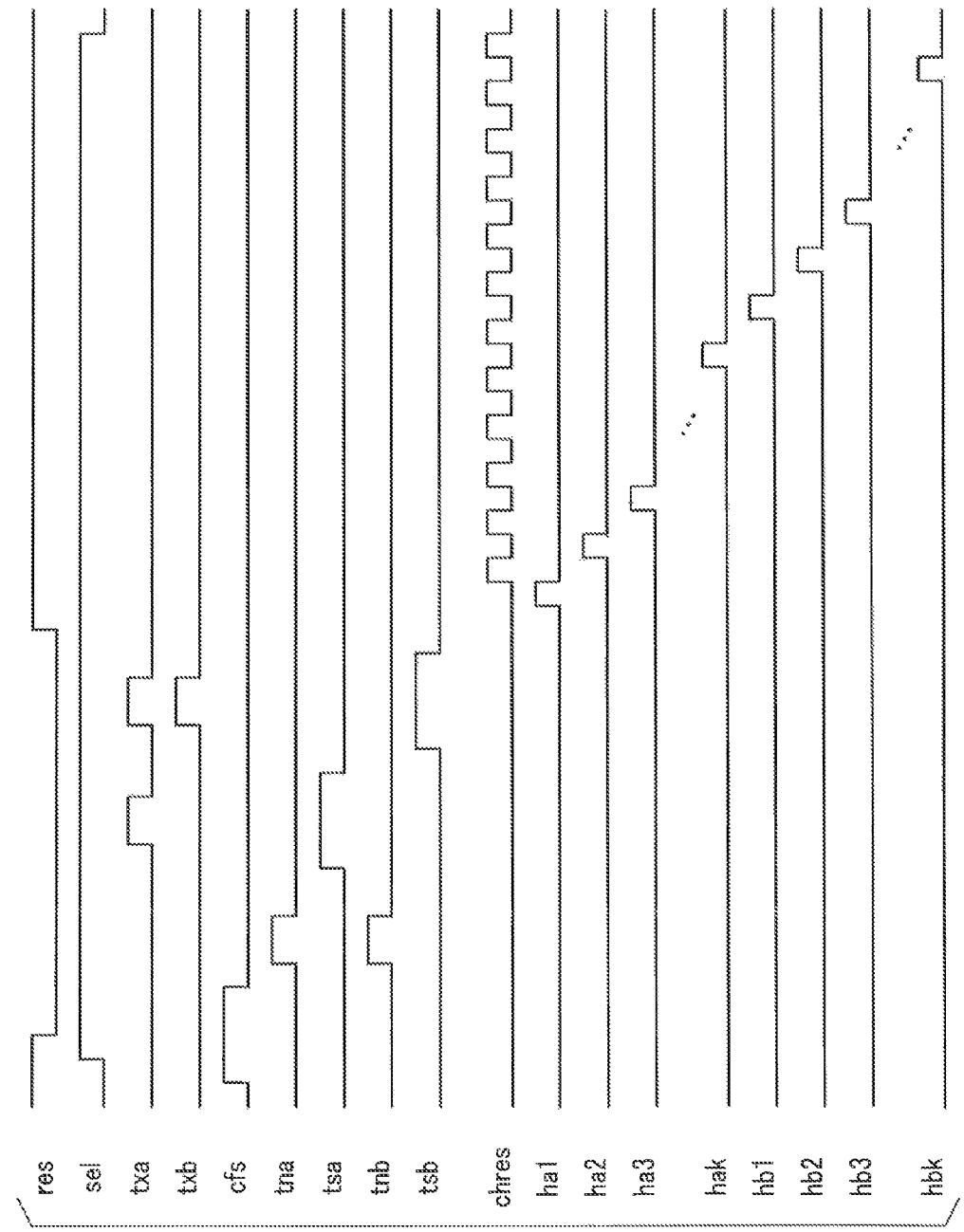
FIG. 8 is a timing chart illustrating a read operation for reading each row of an imaging element.

Next, a description will be given of a read operation performed by the imaging element 106 with reference to FIG. 8. FIG. 8 is a timing chart illustrating a read operation for reading each row of the imaging element 106.

Firstly, the switch 504 shown in FIG. 7 is in an ON state by setting the signal cfs to High level, and then the calculation amplifier 503 is in a buffer state. Next, when the signal sel is set to High level, the pixel selection switch 406 shown in FIG. 6 is turned ON. Then, the FD reset switch 405 is turned OFF by setting the signal res to Low level, and then, the reset of the FD unit 403 is released. Next, after the switch 504 is turned OFF by returning the signal cfs to Low level, signals tna and tnb are set to High level. In this manner, the signal N is stored in the first signal N storage capacitor 510 and the second signal N storage capacitor 512 via transfer switches 506 and 508.

Next, when the signals tna and tnb are set to Low level, the transfer switches 506 and 508 are turned OFF. Then, control is performed such that the transfer switch 505 is turned ON by setting a signal tsa to High level and the transfer gate 402a is turned ON by setting the signal txa to High level. In the course of this operation, the signals accumulated in the PD 401a of the sub-pixel "a" are output to the vertical output line 302 via the FD amplifier 404 and the pixel selection switch 406. The signal from the vertical output line 302 is amplified by a gain corresponding to a capacity ratio between the clamp capacitor C1 and the feedback capacitor C2 by the calculation amplifier 503, and is stored in the first signal S storage capacitor 509 via the transfer switch 505 (the pixel signal Sa).

Next, the signal txa and the signal tsa are sequentially set to Low level. Then, the transfer switch 507 is turned ON by setting a signal tsb to High level and the transfer gates 402a and 402b are turned ON by setting the signals txa and txb to High level. In the course of this operation, the signals accumulated in the PD 401b of the sub-pixel "b" are summed with a signal from the sub-pixel "a" in the FD unit 403. The signal after summation is output to the vertical output line 302 via the FD amplifier 404 and the pixel selection switch 406. A signal from the vertical output line 302 is amplified by a gain corresponding to a capacity ratio between the clamp capacitor C1 and the feedback capacitor C2 by the calculation amplifier 503, and is stored in the second signal S storage capacitor 511 via the transfer switch 507 (summed signal Sab).

When the signal res is set to High level after the transfer gates 402a and 402b and the transfer switch 507 are sequentially turned OFF, the FD reset switch 405 is turned ON and the FD unit 403 is reset.

Next, the horizontal transfer switches 305 and 306 are turned ON by setting the output ha1 from the horizontal scanning circuit 311 to High level. The signals from the first signal S storage capacitor 509 and the first signal N storage capacitor 510 are output to the output terminal 315 via the horizontal output lines 309 and 310 and the differential amplifier 314. The horizontal scanning circuit 311 sets selected signals ha1, ha2, . . . , and hak for each column to High level in sequence so as to output signals (image signals A) from the sub-pixels "a" for one row.

Upon completion of reading the image signal A, the output hb1 from the horizontal scanning circuit 311 is set to High level. In this manner, the horizontal transfer switches 307 and 308 are turned ON, and the signals from the second signal S storage capacitor 511 and the second signal N storage capacitor 512 are output to the output terminal 315 via the horizontal output lines 309 and 310 and the differential amplifier 314. The horizontal scanning circuit 311 sets selected signals hb1, hb2, . . . , and hbk for each column to High level in sequence so as to output a summed signal (the image signal AB) for one row.

In a period of time during which the signals for the respective columns are read by the signals ha1 to hak and the signals hb1 to hbk, the horizontal output line reset switches 312 and 313 are temporarily turned ON by setting the signal chres to High level. At this time, the horizontal output lines 309 and 310 are reset to a level of reset voltage Vchres.

Figure 9:
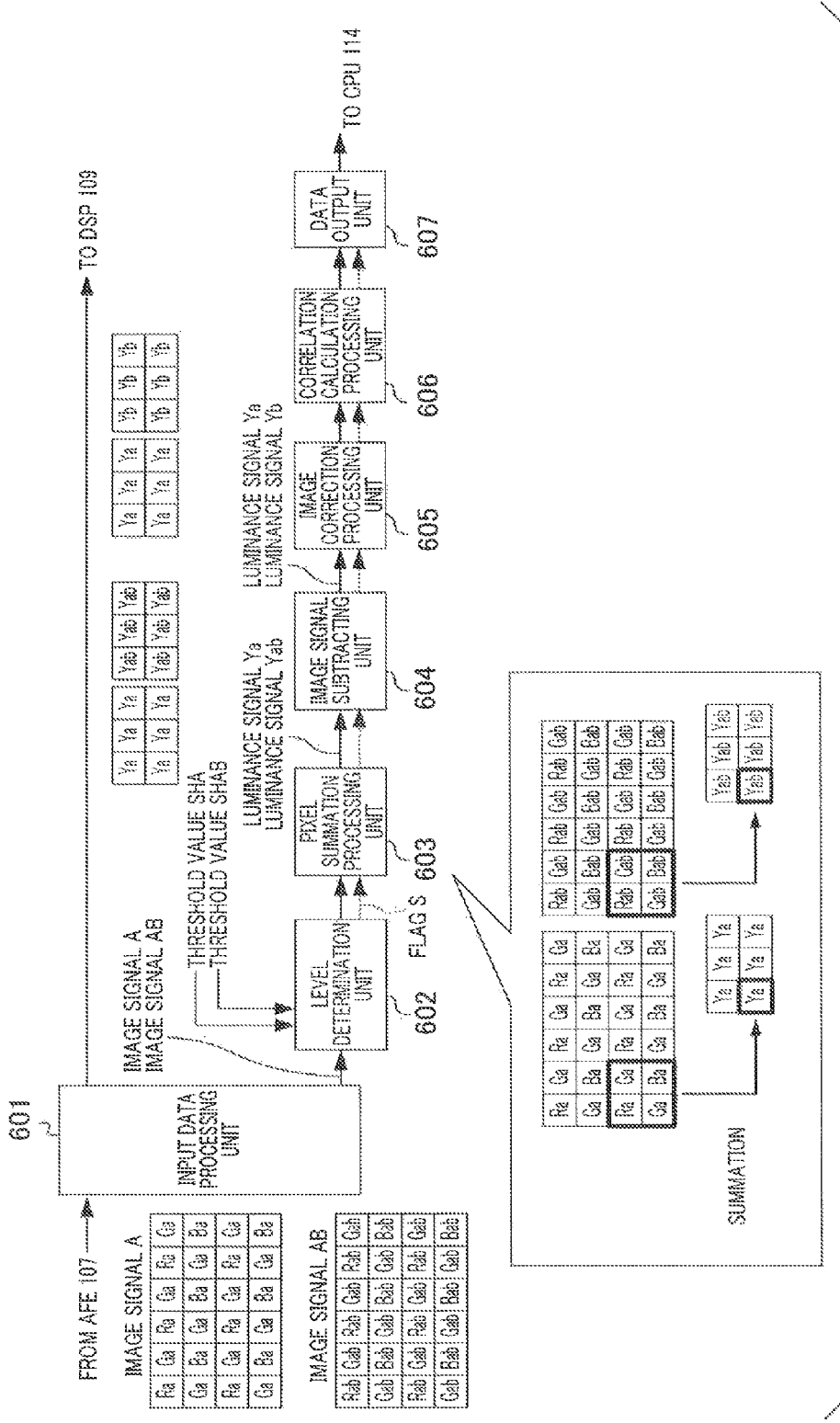
FIG. 9 is a schematic diagram illustrating an exemplary configuration of an image signal processing unit (DFE 108).

Next, a description will be given of the DFE 108 with reference to FIG. 9. FIG. 9 is a block diagram illustrating a configuration of the DFE 108.

A signal read from the imaging element 106 by the aforementioned read operation is input to an input data processing unit 601 via the AFE 107. The input data processing unit 601 outputs the image signal A and the image signal AB both input from the AFE 107 to a level determining unit 602 and outputs the image signal AB only to the DSP 109. The image signal A is a focus detecting signal and the image signal AB is a signal for both focus detection and image generation.

The level determining unit 602 compares the image signal A with a first threshold value SHA and compares the image signal AB with a second threshold value SHAB so as to perform level determination. When either the image signal A or the image signal AB exceeds a threshold value as a result of level determination, the level determining unit 602 sets the value of the flag S for the pixel to '1' and outputs the value to a pixel summation processing unit 603. Thus, information about the flag S indicating the results of level determination for pixels is also transferred to a succeeding stage together with the image signal A and the image signal AB. The threshold value SHA and the threshold value SHAB can be set by the CPU 114.

The pixel summation processing unit 603, an image signal subtracting unit 604, an image correction processing unit 605, a correlation calculation processing unit 606, and a data output unit 607 are calculation units for performing phase difference detection-type focus detecting calculation and are operated under the control of the CPU 114. The pixel summation processing unit 603 performs pixel summation processing for the image signal A and the image signal AB. For a pixel group having two rows and two columns, pixel signals are summed in Bayer units so as to obtain a luminance signal. By means of such processing, the number of data in the image signal A and the image signal AB are reduced by ½ in the horizontal direction and the vertical direction, respectively. The image signal subtracting unit 604 acquires a luminance signal AB (denoted as "Yab") and a luminance signal A (denoted as "Ya") from the pixel summation processing unit 603, and subtracts Ya from Yab so as to generate a luminance signal B (denoted as "Yb"). Since Yab is a luminance signal obtained by summing a signal from the sub-pixel "a" and a signal from the sub-pixel "b" and Ya is a luminance signal from the sub-pixel "a", Yb which is a difference between Yab and Ya represents a luminance signal from the sub-pixel "b".

The image correction processing unit 605 performs correction processing such as fixed pattern noise removal for Ya and Yb acquired from the image signal subtracting unit 604. The correlation calculation processing unit 606 calculates a correlation value Cm(x) from the signal waveforms of Ya and Yb. Firstly, the correlation calculation processing unit 606 integrates the signals of Ya and Yb, respectively, by the number of predetermined lines in the vertical direction. Then, correlation calculation for calculating the correlation value Cm(x) is performed. Upon integration in the vertical direction, pixels having the value '1' of the flag S in one pixel line are selected. When the number of pixels is equal to or greater than a predetermined value (equal to or greater than a threshold value), the line is not included for integration calculation (excluded from the calculation target).

As a method for calculating a correlation value, the following formula is used:

$$Cm(x) = \sum_{n=p}^{q} (Ya_n - Yb_{n+x})^2 \qquad [\text{Formula 1}]$$

In this case, the minimum point of the correlation value Cm(x) is a highest correlation point. A correlation value may also be calculated from the absolute value of the difference between Ya and Yb. A correlation value may also be calculated from the following formula:

$$Cm(x) = \sum_{n=p}^{q} \text{MAX}(Ya_n, Yb_{n+x}) \qquad [\text{Formula 2}]$$

MAX (A, B) denotes to select the greater of A and B. A correlation value may also be calculated by a method for selecting the smaller of A and B.

The data output unit 607 outputs the correlation value Cm(x) calculated by the correlation calculation processing unit 606 to the CPU 114. The CPU 114 selects a highest correlation point from the acquired correlation value Cm(x) so as to calculate a defocus amount. The CPU 114 controls the focus drive circuit 116 based on the calculated defocus amount.

Next, a description will be given of a phenomenon in which an electric charge leaks between the sub-pixel "a" (401a) and the sub-pixel "b" (401b) with reference to FIG. 10A. Components within the unit pixel portion 300 shown in FIG. 3 is shown in the upper part of FIG. 10A and a schematic diagram illustrating the state of a potential energy is shown in the lower part of FIG. 10A. Assume that the incident light quantity on the sub-pixel "a" is large and the incident light quantity on the sub-pixel "b" is small. When the amount of accumulated photoelectric charges generated in the sub-pixel "a" exceeds a predetermined level, the photoelectric charges in the sub-pixel "a" exceed a potential barrier between the sub-pixel "a" and the sub-pixel "b" and leak into the sub-pixel "b".

Figure 10B:
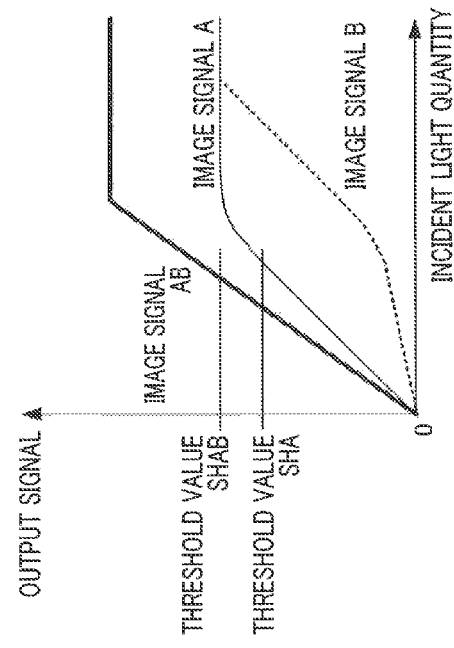
FIGS. 10A and 10B are schematic diagrams illustrating the relationship between an incident light quantity on a unit pixel portion and an output signal.
Figure 10A:
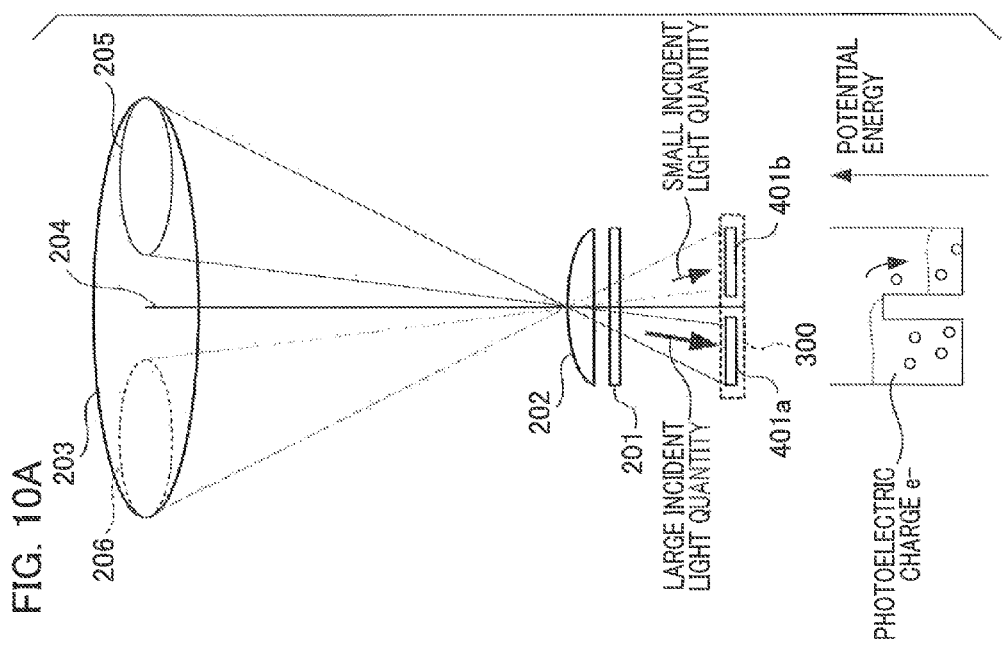

FIG. 10B is a diagram illustrating the relationship between an incident light quantity on the unit pixel portion 300 and an output signal. When the photoelectric charges accumulated in the sub-pixel "a" are large, the photoelectric charges in the sub-pixel "a" leak into the sub-pixel "b", so that a part of the signal from the sub-pixel "a" starts to mix into the signal from the sub-pixel "b". The threshold value SHA is set to a level at which the reliability of signals starts to be decreased upon the start of signal mixture. When the level of the image signal A exceeds the threshold value SHA, the output from the pixel is excluded so as not to affect correlation calculation processing. In FIGS. 10A and 10B, a description has been given by taking an example of the case where the incident light quantity on the sub-pixel "a" is relatively greater than the incident light quantity on the sub-pixel "b". On the contrary, when the incident light quantity on the sub-pixel "b" is relatively greater than the incident light quantity on the sub-pixel "a", the threshold value SHAB is set for the image signal AB. When the level of the image signal AB exceeds the threshold value SHAB, the pixels is excluded from the targets to be subject to correlation calculation in the same way as described above.

The threshold value SHA and the threshold value SHAB are set for the level of the image signal from the level determining unit 602. Thus, when the gain settings for the upstream side than the level determining unit 602 are changed by the ISO sensitivity settings of the imaging apparatus or the like, the CPU 114 changes the threshold value SHA and the threshold value SHAB accordingly. For example, when the gain settings for the calculation amplifier 503 and the differential amplifier 314 provided within the imaging element and the AFE 107 are changed, a threshold value needs to be changed. The aforementioned description has been given of the case where ISO sensitivity settings are low.

Figure 11:
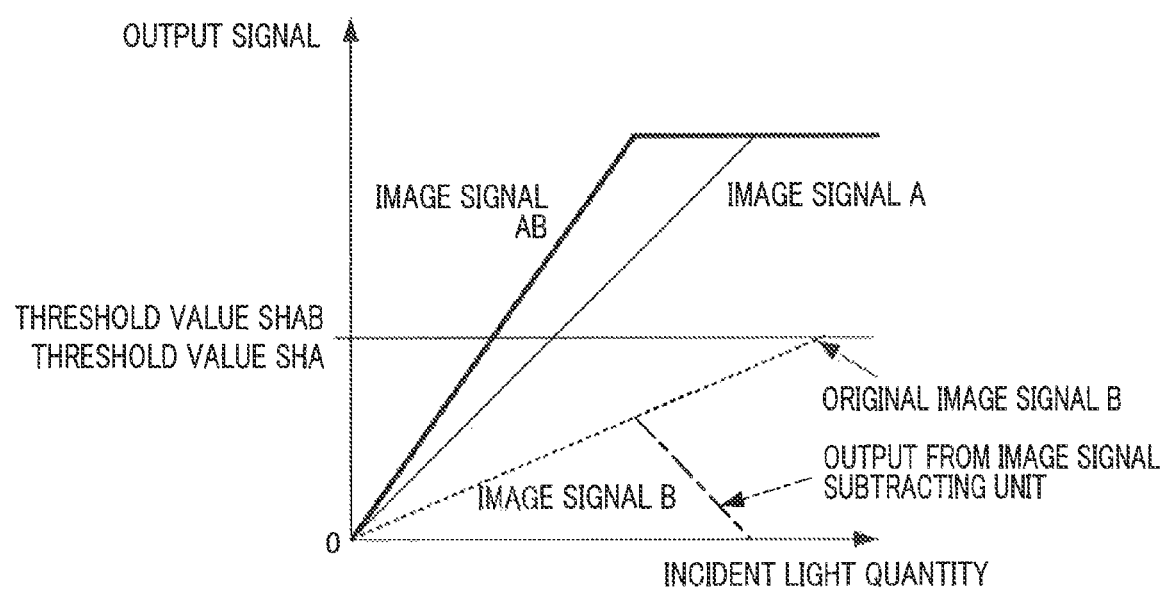
FIG. 11 is a schematic diagram illustrating the relationship between an incident light quantity and an output signal at high ISO sensitivity settings.

Next, a description will be given of signal processing performed when ISO sensitivity settings are high and a gain to be multiplied at the upstream side than the level determining unit 602 is large with reference to FIG. 11. When the gain setting value of the upstream side is high, a signal having a small incident light quantity is amplified for usage. The mixture of signals between sub-pixels as described with reference to FIGS. 10A and 10B does not occur. It should be noted that, when the signal level is set such that the image signal AB is saturated, the image signal subtracting unit 604 does not correctly calculate a signal upon generating a luminance signal B. The graph line shown by the dotted line in FIG. 11 shows a change when an image signal B is calculated by subtracting the level of the image signal A from the level of the unsaturated image signal AB. The level of the image signal B increases with an increase in incident light quantity. On the other hand, the graph line shown by the signal-dot chain line in FIG. 11 shows a change when the image signal AB is saturated. Since the level of the image signal A is subtracted from the saturated level (constant level) upon saturation of the image signal AB, the level of the image signal B decreases with an increase in incident light quantity. In this manner, the reliability of the image signal B (consequently, luminance signal Yb) is decreased, so that the correlation value Cm(x) is not calculated as appropriate. Accordingly, the CPU 114 sets the threshold value SHA and the threshold value SHAB to values different from those at low ISO sensitivity settings so as to avoid consequence such that signals with low reliability are used for correlation calculation.

According to the present embodiment, image signals are excluded as appropriate depending on the capture condition in order to suppress the adverse effect of signals with low reliability, so that an appropriate focus detection operation can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, a description has been given by taking an example of the case where the level determining unit 602 sets the value of the flag S to '1' for the pixel which is determined to have exceeded a threshold value. The present invention is not limited thereto, for example, the image signal of the corresponding pixel may also be substituted with a specific code. The correlation calculation processing unit 606 may also select whether or not each pixel is included as a target for correlation calculation without counting a flag for each line.

Furthermore, a description has been given by taking an example of the case where the level determining unit 602 compares the levels of the image signal A and the image signal AB with the first and second threshold values, respectively, so as to perform level determination. The present invention is not limited thereto but level determination may also be performed by setting a third threshold value for the image signal B or the luminance signal Yb. In this case, the level determining unit 602 or the correlation calculation processing unit 606 performs level determination.

While a description has been given by taking an example of the case where the imaging element 106 outputs a signal Sa from the sub-pixel "a" and a summed signal Sab obtained by summing the sub-pixel "a" and the sub-pixel "b", the imaging element 106 may also be configured to output a signal from the sub-pixel "a" and a signal from the sub-pixel "b". In this case, the level determining unit 602 compares the image signal A (first signal) and the image signal B (second signal) with the respective threshold values so as to perform level determination.

According to the present embodiment, a plurality of signals including output signals from the photoelectric conversion units provided in each pixel portion of the imaging element, i.e., a first signal (the image signal A) and a second signal (the image signal AB) or a third signal (the image signal B) are output. The first to third signals are signals for use in phase difference detection-type focus detecting calculation. The focus detecting calculation unit (see the pixel summation processing unit 603, the image signal subtracting unit 604, the image correction processing unit 605, the correlation calculation processing unit 606, and the data output unit 607 in FIG. 9) acquires a focus detecting signal and compares it with each of the first to third threshold values. The focus detecting calculation unit executes processing for excluding a signal exceeding a threshold value, that is, a signal which is determined to have a low reliability from a target for correlation calculation. In this manner, an adverse effect on focus detecting calculation due to inappropriate signals is suppressed depending on the capture condition, so that exact focus detection can be performed.

While, in the present embodiment, a description has been given by taking a case where threshold values are respectively set for the image signal A and the image signal AB (or the image signal B) which are used for focus detection and these threshold values are changed depending on the capture condition, an exemplary application of the present invention is not limited to a focus detection operation alone.

An exemplary application of processing by using signals from the sub-pixel "a" and the sub-pixel "b" subjected to pupil division as described above is not limited to focus detection. For example, the processing may also be applicable to generation of 3D images. In this case, an image signal A and an image signal B both obtained from the signals from the sub-pixel "a" and the sub-pixel "b" have a parallax with each other, and thus, a stereoscopic image can be generated by using one for the right visual point image and the other for the left visual point image. If electric charge leakage occurs between sub-pixels, a correct stereoscopic image may not be obtained. As an exemplary application in this case, it is contemplated that threshold values are respectively set for the image signal A and the image signal AB (or the image signal B) so as to clip any pixel signal value exceeding these threshold values. Of course, a threshold value may be different for each of ISO sensitivity settings.

(Other Embodiments)

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-055927, filed on Mar. 19, 2013, which is hereby incorporated by reference herein in its entirety.

What is claimed is:

1. An imaging apparatus comprising:
an imaging element that includes pixel portions each having a plurality of photoelectric conversion units and outputs a first parallax image signal and a second parallax image signal from the photoelectric conversion units;
a calculation unit configured to perform phase difference detection-type focus detecting calculation using a first signal obtained by performing pixel combine processing on the first parallax image signal and a second signal obtained by performing pixel combine processing on the second parallax image signal; and
a control unit configured to acquire the result of calculation performed by the calculation unit so as to perform focus adjustment based on the result of calculation performed by the calculation unit,
wherein the calculation unit compares, before performing the pixel combine processing to obtain the first signal, the first parallax image signal with a first threshold value, and compares, before performing the pixel combine processing to obtain the second signal, the second parallax image signal with a second threshold value, so as to perform the focus adjustment in a restrictive manner using the first signal and the second signal when the first parallax image signal exceeds the first threshold value or the second parallax image signal exceeds the second threshold value.

2. The imaging apparatus according to claim 1, wherein the calculation unit includes a level determining unit configured to determine whether the first parallax image signal exceeds the first threshold value or the second parallax image signal exceeds the second threshold value, and wherein the control unit changes the first threshold value and the second threshold value in accordance with a capture condition.

3. The imaging apparatus according to claim 2, wherein the calculation unit includes a correlation calculation processing unit configured to perform correlation calculation using the first signal and the second signal when the first parallax image signal does not exceed the first threshold value and the second parallax image signal does not exceed the second threshold value.

4. The imaging apparatus according to claim 3, wherein the calculation unit includes a subtraction unit configured to generate a third signal obtained by subtracting the first signal from the second signal, and the correlation calculation processing unit performs correlation calculation using the first signal and the third signal.

5. The imaging apparatus according to claim 4, wherein the calculation unit compares the third signal with a third threshold value and excludes the third signal exceeding the third threshold value from a target for correlation calculation.

6. The imaging apparatus according to claim 1, wherein the second signal is a signal obtained by adding the first parallax image signal and the second parallax image signal.

7. The imaging apparatus according to claim 1, wherein, when the number of pixel portions having a signal which has been excluded from a pixel line by level determination is equal to or greater than a threshold value upon integration of the first signal and the second signal, the calculation unit excludes output signals from the first and second photoelectric conversion units constituting each of the pixel portions from a target for integration calculation.

8. The imaging apparatus according to claim 1, wherein, when a sensitivity setting of the imaging apparatus or a gain setting of the imaging element is changed, the control unit changes the first or the second threshold value.

9. The imaging apparatus according to claim 1, wherein the focus adjustment is performed in the restrictive manner by not using the first signal and the second signal when the first parallax image signal exceeds the first threshold value or the second parallax image signal exceeds the second threshold value.

10. The imaging apparatus according to claim 1, further comprising a drive unit configured to drive a focus adjusting lens.

11. A control method to be executed by an imaging apparatus comprising an imaging element that includes pixel portions each having a plurality of photoelectric conversion units and outputs a first parallax image signal and a second parallax image signal from the photoelectric conversion units, the control method comprising:
performing phase difference detection-type focus detecting calculation using a first signal obtained by performing pixel combine processing on the first parallax image signal and a second signal obtained by performing pixel combine processing on the second parallax image signal; and
acquiring the result of the phase difference detection-type focus detecting calculation so as to perform focus adjustment based on the result of calculation performed by the calculation unit,
wherein the phase difference detection-type focus detecting calculation includes comparing, before performing the pixel combine processing to obtain the first signal, the first parallax image signal with a first threshold value, and comparing, before performing the pixel combine processing to obtain the second signal, the second parallax image signal with a second threshold value, so as to perform the focus adjustment in a restrictive manner using the first signal and the second signal when the first parallax image signal exceeds the first threshold value or the second parallax image signal exceeds the second threshold value.

12. An imaging apparatus comprising:
an imaging element that includes pixel portions each having a plurality of photoelectric conversion units for generating a plurality of parallax image signals;
a calculation unit configured to perform focus detecting calculation based on a signal obtained by performing pixel combine processing on the plurality of parallax image signals; and
a level determining unit configured to compare at least one of the plurality of parallax image signals with a first threshold value or the signal obtained by performing the pixel combine processing with a second threshold value, so as to perform the focus detecting calculation in a restrictive manner when any one of the plurality of parallax image signals exceeds the first threshold value or the signal obtained by performing the pixel combine processing exceeds the second threshold value,
wherein the level determining unit changes the corresponding threshold value in accordance with a capture condition.

13. The imaging apparatus according to claim 12, wherein the plurality of parallax image signals includes first parallax image signals and second parallax image signals.

14. The imaging apparatus according to claim 13, wherein the signal obtained by the pixel combine processing includes a combination of one of the first parallax image signals and one of the second parallax image signals.

15. The imaging apparatus according to claim 12, wherein the capture condition includes ISO sensitivity settings.

16. The imaging apparatus according to claim 12, wherein in the case that any signal from the comparison exceeds the respective threshold value, the level determining unit sets a flag on the signal obtained by performing the pixel combine processing, and the calculation unit is restricted from performing focus detecting calculation according to the flag.

17. The imaging apparatus according to claim 12, wherein in the case that any signal from the comparison exceeds the respective threshold value, the calculation unit is restricted from performing focus detecting calculation by excluding the parallax image signal that is determined as exceeding the respective threshold value, from a subject of the focus detecting calculation.

18. The imaging apparatus according to claim 12, wherein the first threshold value is different from the second threshold value.

19. The imaging apparatus according to claim 12, wherein the calculation unit is configured to perform the focus detecting calculation in the restrictive manner by not using any one of the plurality of parallax image signals which exceeds the first threshold value.

20. The imaging apparatus according to claim 12, wherein the calculation unit is configured to perform the focus detecting calculation in the restrictive manner by not using the signal obtained by performing the pixel combine processing which exceeds the second threshold value.

* * * * *